(12) United States Patent
Jiang et al.

(10) Patent No.: US 11,188,231 B2
(45) Date of Patent: Nov. 30, 2021

(54) DATA PLACEMENT ON STORAGE DEVICES

(71) Applicant: International Business Machines Corporation, Armonk, NY (US)

(72) Inventors: Liang (Alan) J. Jiang, Austin, TX (US); Anil Kalavakolanu, Austin, TX (US); Brian W. Hart, Austin, TX (US); Vani D. Ramagiri, Austin, TX (US); Tao T. Chen, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 279 days.

(21) Appl. No.: 16/289,795

(22) Filed: Mar. 1, 2019

(65) Prior Publication Data

US 2020/0278793 A1    Sep. 3, 2020

(51) Int. Cl.
*G06F 3/06* (2006.01)
*G11B 20/12* (2006.01)

(52) U.S. Cl.
CPC .......... *G06F 3/0608* (2013.01); *G06F 3/0643* (2013.01); *G06F 3/0676* (2013.01);
(Continued)

(58) Field of Classification Search
CPC ............... G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768;
(Continued)

(56) References Cited

U.S. PATENT DOCUMENTS

| | | | |
|---|---|---|---|
| 4,500,960 A * | 2/1985 | Babecki | H04L 69/24 710/100 |
| 6,601,763 B1 * | 8/2003 | Hoch | B65G 1/1371 235/375 |

(Continued)

OTHER PUBLICATIONS

Definition shingled magnetic recording (SMR); TechTarget Contributor; Jul. 2015; retrieved from https://searchstorage.techtarget.com/definition/shingled-magnetic-recording-SMR on Jan. 30, 2021 (Year: 2015).*

(Continued)

*Primary Examiner* — Daniel C. Chappell
(74) *Attorney, Agent, or Firm* — Cantor Colburn LLP; Nathan Rau

(57) ABSTRACT

An aspect includes receiving a write request at a storage device. The write request includes data and is received from a file system executing on a host computer communicatively coupled to the storage device. A storage location on the storage device for the data is selected by the storage device based at least in part on characteristics of the storage device. The data is stored at the storage location on the storage device. A write completion message is sent to the file system confirming that the write of the data has been completed. The write completion message includes an identifier of the storage location.

20 Claims, 4 Drawing Sheets

(52) U.S. Cl.
CPC ........ *G06F 3/0679* (2013.01); *G11B 20/1217* (2013.01); *G11B 2020/1238* (2013.01); *G11B 2020/1292* (2013.01)

(58) Field of Classification Search
CPC .......... G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11B 20/00–24
See application file for complete search history.

(56) References Cited

U.S. PATENT DOCUMENTS

| | | | |
|---|---|---|---|
| 7,725,568 B2* | 5/2010 | Ng | H04L 67/1097 709/223 |
| 8,370,312 B1 | 2/2013 | Swhney et al. | |
| 9,652,151 B2 | 5/2017 | Chiu et al. | |
| 9,740,627 B2 | 8/2017 | White et al. | |
| 9,823,840 B1 | 11/2017 | Brooker et al. | |
| 9,864,642 B2 | 1/2018 | Gupta et al. | |
| 9,870,281 B1* | 1/2018 | Gosla | G11B 20/10527 |
| 9,965,381 B1 | 5/2018 | Sahin et al. | |
| 9,972,353 B1* | 5/2018 | Qiang | G11B 20/1217 |
| 10,599,339 B2* | 3/2020 | Jiang | G06F 3/0676 |
| 2008/0005475 A1* | 1/2008 | Lubbers | G06F 3/0689 711/118 |
| 2009/0216973 A1* | 8/2009 | Nakajima | G06F 11/1451 711/162 |
| 2009/0265403 A1* | 10/2009 | Fukumoto | G06F 12/0246 |
| 2011/0122438 A1* | 5/2011 | Someya | G06F 3/1284 358/1.15 |
| 2011/0153911 A1* | 6/2011 | Sprouse | G11C 11/5628 711/103 |
| 2012/0096059 A1* | 4/2012 | Shimizu | G06F 16/1727 707/828 |
| 2012/0117309 A1* | 5/2012 | Schuette | G06F 3/0652 711/103 |
| 2014/0229447 A1 | 8/2014 | Aslot et al. | |
| 2014/0289449 A1* | 9/2014 | Ogata | G06F 3/064 711/103 |
| 2015/0095572 A1* | 4/2015 | Koike | G06F 3/0625 711/114 |
| 2015/0106410 A1* | 4/2015 | Zaltsman | G06F 16/1847 707/824 |
| 2015/0309732 A1* | 10/2015 | Kandasamy | G06F 3/0676 711/103 |
| 2015/0379053 A1* | 12/2015 | Bhattacharjee | G06F 16/245 707/722 |
| 2016/0011782 A1* | 1/2016 | Kurotsuchi | G06F 11/1068 711/104 |
| 2016/0085467 A1 | 3/2016 | Saxena et al. | |
| 2016/0188461 A1* | 6/2016 | Takabatake | G06F 3/0679 711/103 |
| 2016/0188700 A1 | 6/2016 | Kleinschnitz, Jr. et al. | |
| 2017/0024137 A1* | 1/2017 | Kanno | G06F 3/0644 |
| 2017/0147460 A1 | 5/2017 | Traeger et al. | |
| 2017/0154649 A1* | 6/2017 | Shiratori | G06F 3/0629 |
| 2017/0161300 A1 | 6/2017 | Novick | |
| 2017/0286014 A1* | 10/2017 | Hady | G06F 3/0679 |
| 2018/0081581 A1* | 3/2018 | Miyamoto | G06F 3/0631 |
| 2018/0173438 A1* | 6/2018 | Li | G06F 3/0655 |
| 2018/0341697 A1* | 11/2018 | Eda | G06F 16/316 |
| 2020/0034039 A1* | 1/2020 | Jiang | G06F 3/067 |
| 2020/0319816 A1* | 10/2020 | Li | G06F 3/0688 |

OTHER PUBLICATIONS

Data Structures on Disk Drives; SNIA; Apr. 9, 2016; retrieved from https://web.archive.org/web/20160409111724/https://www.snia.org/education/storage_networking_primer/stor_devices/data_structure on Aug. 11, 2021 (Year: 2016).*

J. Im, H. Kim, Y. Won, J. Oh, M. Kim and S. Lee, "Probability-Based Address Translationfor Flash SSDs," in IEEE Computer Architecture Letters, vol. 19, No. 2, pp. 97-100, Jul. 1-Dec. 2020, doi: 10.1109/LCA.2020.3006529. (Year: 2020).*

J. Carter et al., "Impulse: building a smarter memory controller," Proceedings Fifth International Symposium on High-Performance Computer Architecture, 1999, pp. 70-79, doi: 10.1109/HPCA.1999.744334. (Year: 1999).*

N. Hajinazar et al., "The Virtual Block Interface: A Flexible Alternative to the Conventional Virtual Memory Framework," 2020 ACM/IEEE 47th Annual International Symposium on Computer Architecture (ISCA), 2020, pp. 1050-1063, doi: 10.1109/ISCA45697.2020.00089. (Year: 2020).*

T. C. Xu, P. Liljeberg and H. Tenhunen, "Optimal memory controller placement for chip multiprocessor," 2011 Proceedings of the Ninth IEEE/ACM/IFIP International Conference on Hardware/Software Codesign and System Synthesis (CODES+ISSS), 2011, pp. 217-226, doi: 10.1145/2039370.2039405. (Year: 2011).*

Ferdaus et al.; "An Algorithm For Network And Data-Aware Placement . . . Data Centers", Journal Of Network And Computer Applications, vol. 98, Nov. 15, 2017, pp. 1-28.

Krish et al.; "hatS: A Heterogeneity-Aware Tiered Storage For Hadoop", CCGrid IEEE/ACM 14th International Symposium On, May 26-29, 2014, pp. 502-511.

Oh et al.; "TripS: Automated Multi-Tiered Data Placement In A Geo-Distributed Cloud Environment", SYSTOR'17 ACM 10th International Conference On, May 22-24, 2017, pp. 1-11.

Su et al.; "Systematic Data Placement Optimization In Multi-Cloud Storage For Complex Requirements", IEEE Transactions On Comp., vol. 65, Iss. 6, Jun. 1, 2016, pp. 1964-1977.

* cited by examiner

DATA PLACEMENT ON STORAGE DEVICES

BACKGROUND

The present invention relates to computer memory, and more specifically, to logic located on a storage device for determining placement of write data on the storage device and for communicating the data placement to a requestor of the write.

SUMMARY

Embodiments include a method, system, and computer program product for data placement on storage devices. A method includes receiving a write request at a storage device. The write request includes data and is received from a file system executing on a host computer communicatively coupled to the storage device. A storage location on the storage device for the data is selected by the storage device based at least in part on characteristics of the storage device. The data is stored at the storage location on the storage device. A write completion message is sent to the file system confirming that the write of the data has been completed. The write completion message includes an identifier of the storage location.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
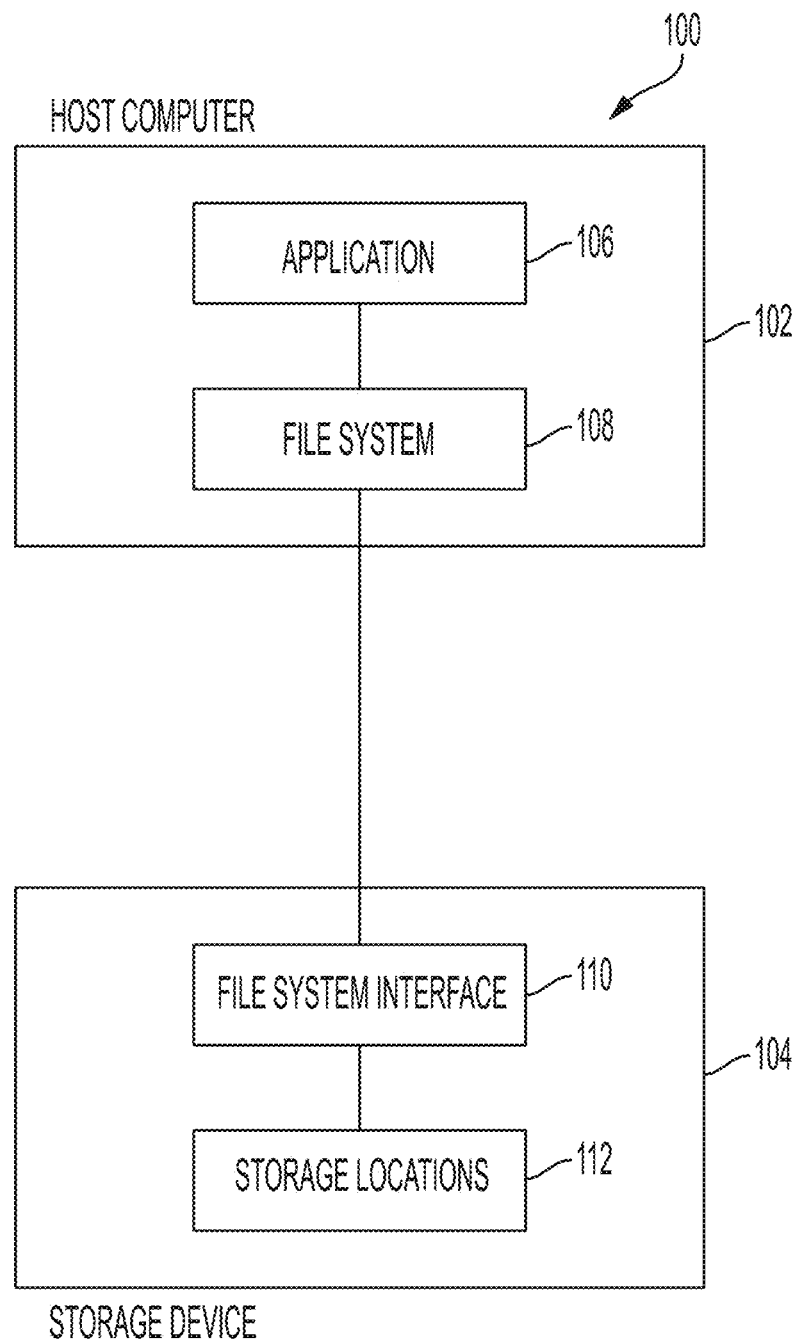
FIG. 1 illustrates a block diagram of components of a system for data placement on a storage device in accordance with one or more embodiments of the present invention.

One or more embodiments of the present invention provide optimized data placement on storage devices. In accordance with one or more embodiments of the present invention, placement of write data in a storage device is determined by the storage device. A host file system can provide one or more hints about data access patterns to the storage device for use by the storage device in determining the data placement. In accordance with one or more embodiments of the present invention, the host file system which initiates the writing of data to the storage device learns of the location where the data is stored after the data is written to the storage device.

One or more embodiments of the present invention include logic executing on a storage device to determine data placement on the storage device. This is contrasted with contemporary methods where data placement on a storage device is determined by a file system executing on a host computer. Contemporary host file systems control how data is stored and how data is retrieved. Examples of contemporary host file systems include, but are not limited to: AIX® JFS2 from IBM, Linux® Ext4, and ZFS® from Oracle. Contemporary writes to a storage device typically include: a host computer executing a host file system that receives data to be written to a storage device from an application executing on the host computer; the host file system selecting a storage location on the storage device for the write data; and the host file system sending the write data along with the address of the storage location (e.g., a logical block address or "LBA") to the storage device. The storage device receives the write data and the address, stores the write data in the storage device at the specified address, and sends a completion message to the host file system.

Contemporary file systems go to great lengths to lay out data optimally for different storage device, or drive, types. Most contemporary file systems are designed for legacy drives (e.g., spinning drives such as a direct access storage device or "DASD"). As newer drive technologies such as, but not limited to, solid state drives (SSDs) and shingled magnetic recording (SMR) drives are introduced, changes to the file system code are required to support the new technologies. Generally, each new drive type requires new code in the file system as each new disk technology brings a new set of characteristics that the file system needs to address. For example, for spinning disks data contiguity is important for optimal performance, for SSDs write cycles of cells are important for the life span of the drive, and for SMRs hardware limitations require active zone management and sequential writes. Characteristics of storage devices include, but are not limited to mechanical implementation (e.g. rotation and track-to-track seek mechanisms); limitations on write cycles; physical overlap of data written to the medium; and internal grouping or arrangement of multiple devices.

Some drives, or devices, try to remove these different concerns caused by different characteristics by hiding the data placement from the host file system. For example, drive managed mode of SMR drives provides an abstraction that looks like legacy drives to the host file system. However, the choices the file system makes when presented with a legacy drive may in fact not be suitable for SMR drives and may even work against the drive's optimization. Even if the choices made by the file system are suitable they are often ignored by the drive when in drive managed mode and any effort that the file system put into placement is unnecessary extra work.

In accordance with one or more embodiments of the present invention the host file system leaves the choice of data placement to the storage devices, and the storage devices perform data placement based on their specific characteristics. In addition, a communications protocol is provided between host file systems and storage devices to reflect the data placement techniques provided by one or more embodiments of the present invention. One or more embodiments of the present invention allow the removal of legacy code that enabled the host file system to perform data placement, from both the host file system and the storage device. Benefits of one or more embodiments of the present invention include not having to maintain the legacy code in the host file system logic for different types of storage devices. By having the data placement logic located on the storage devices, the host file system logic does not require modification in order to optimize data placement for different or newly introduced types of storage devices. In addition, one or more embodiments of the present invention allow the contemporary methods of performing read requests to remain unchanged as the host file system 108 is made aware of and records the location of the data after it is written to the storage device.

Further benefits include preventing the legacy code from being detrimental by making placement choices that work against the characteristics of the device. For example, a legacy file system that expects to interact with a multi-part device might attempt to spread data across several extents, but spreading could shorten the life of a write-cycle limited device or be counter to the overlap limitations of a shingled device. Logic to provide functional support from the storage devices will still be required, however the code can be targeted to providing the best storage device performance rather than preserving legacy behavior. The host file system can expect to interact with a simple abstraction without needing to choose physical location of data or to consider physical characteristics of the device. Instead the device will make appropriate placement choices and communicate those to the file system.

Turning now to FIG. 1, a block diagram of components of a system 100 for data placement on a storage device is generally shown in accordance with one or more embodiments of the present invention. The components shown in the system 100 of FIG. 1 include a host computer 102 and a storage device 104. The host computer 102 and storage device 104 can be in communication, or communicatively coupled, using any short or long range communication method known in the art such as, but not limited to Serial Attached SCSI (SAS), Serial ATA (SATA), fibre channel, and SCSI over IP.

As shown in FIG. 1, the host computer 102 includes an application 106 and a file system 108. In accordance with one or more embodiments of the present invention, the application 106 executing on the host computer 102 generates write data and sends a request to write the data to the file system 108. The file system 108 sends the write data and write request to the storage device 104. The file system 108 is notified by the storage device 104 when the write has been completed. In addition, the storage device 104 provides the file system 108 with an identifier of the selected storage location (e.g., a logical block address or "LBA") where the data is stored. The file system 108 stores the identifier of the selected storage location and uses it when performing subsequent reads of the data. In accordance with one or more embodiments of the present invention, the data may represent a variable which is updated by an application and a read request is performed at the selected storage location to determine a current value of the variable.

As shown in FIG. 1, the storage device 104 includes a file system interface 110 and physical storage with storage locations 112. In accordance with one or more embodiments of the present invention, the write data and write request are received by the file system interface 110 of the storage device 104. The file system interface 110 includes logic to receive the write data, to select a storage location 112 for the write data, and to store the write data in the selected storage location(s) 112. Once the data has been successfully written to the selected storage location 112, the file system interface 110 sends an identifier of the selected storage location 112 (e.g., a LBA) and a write completion message to the host file system 108.

There are some cases where the file system 108 may need to store data at a fixed storage location or know the storage location in advance. One example is a file system "super block" which anchors the file system, and includes references to core file system structures that record the locations of all data. Super blocks are usually stored at a fixed location so they can be found readily during initialization. These cases can be addressed using a tagged write method or by having the storage device provide a virtual mapping for some "well-known" LBA range such as, but not limited to, the first one megabyte (MB) of the LBA space. In the tagged write method case, the tag stands in for a well-known LBA. A tag could mimic an LBA or be arbitrary. For example, a file system might request a write tagged with "00000000" or "FS1 super."

The virtual mapping can be implemented by a table on the storage device that associates tags with physical locations. In accordance with one or more embodiments of the present invention, the file system 108 specifies a tag for the write data which it sends along with the write data to the file system interface 110 as part of a write request. The file system interface 110 decides the actual storage location for the write data and establishes a mapping from the tag to the storage location. The use of a tag can allow the storage device 104 to know when it is safe to reuse the storage space (e.g., the storage locations 112). For example, storage space may be able to be freed-up for re-use when a tag is re-used.

Figure 2:
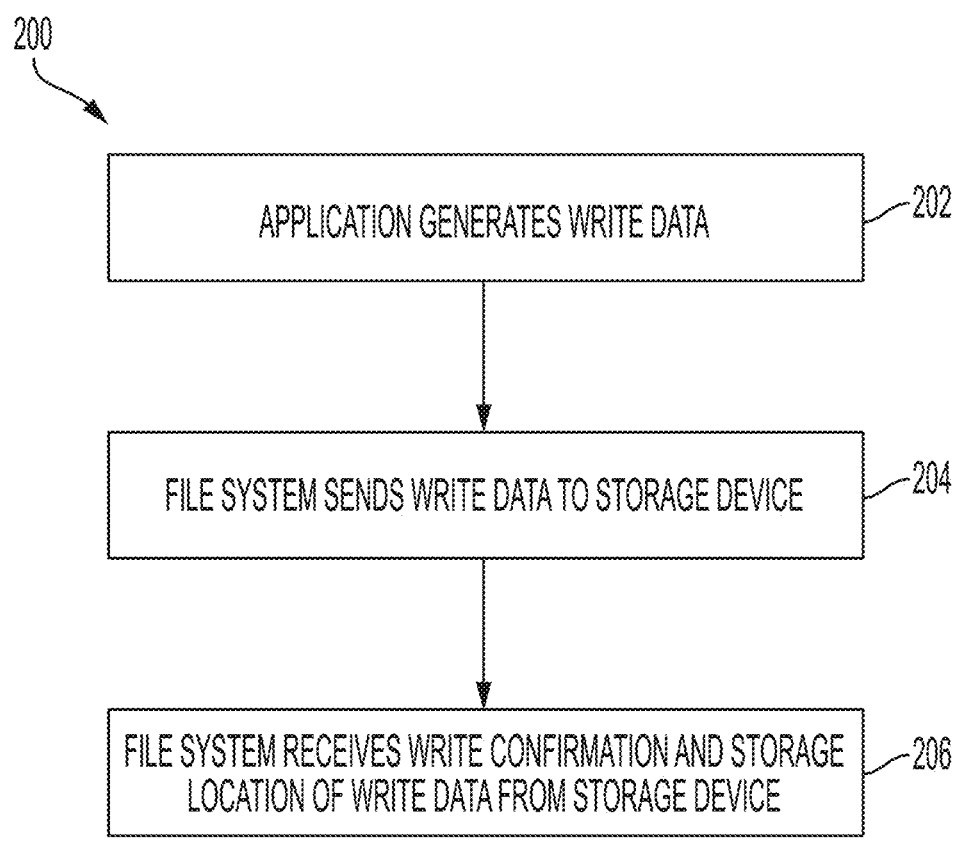
FIG. 2 illustrates a flow diagram of a process for writing data to a storage device in accordance with one or more embodiments of the present invention.

Turning now to FIG. 2, a flow diagram 200 of a process for writing data to a storage device is generally shown in accordance with one or more embodiments of the present invention. The processing shown in FIG. 2 is performed by logic executing on a host computer, such as host computer 102 of FIG. 1. At block 202, an application, such as application 106 of FIG. 1, generates write data. At block 204, a host file system, such as host file system 108 of FIG. 1, sends the write data to a storage device, such as storage device 104 of FIG. 1. In accordance with one or more embodiments of the present invention, the host file system may also send information, or hints, about characteristics of the write data in order to assist the storage device in making an optimum choice about where to store the data. The file system can provide hints based on expected access pattern of the data and/or predefined data patterns. The hints can include, but are not limited to: expected access frequency; sequential versus random access; expected ratio of reads versus writes; an indicator if this is temporary data (e.g., expected lifespan); backup requirements; security requirements of the data; latency requirements; expiration dates; compressibility of the data; and/or redundancy requirements of the data.

At block 206 of FIG. 2, the file system receives a confirmation from the storage device that the write data was written to the storage device and an identifier of the storage location of the write data. The identifier of the storage location can be used by the file system for subsequent read operations. The file system may also perform further similar writes, for example to update a file's meta-data to include the returned storage location. The file system may perform a cascade of writes in this way culminating in a tagged write to the super block. If the write resulted in an error (e.g., the write was not completed), then the file system will receive an error message at block 206.

Figure 3:
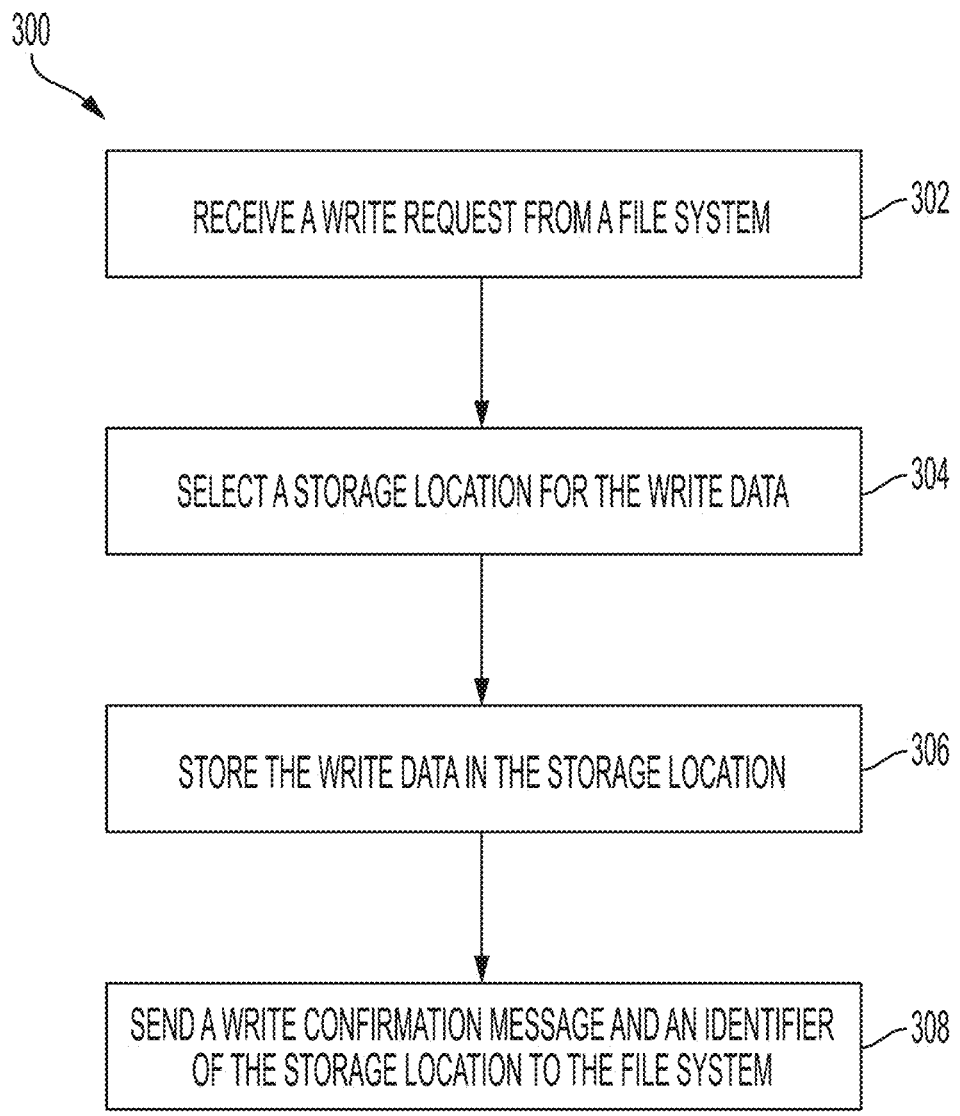
FIG. 3 illustrates a flow diagram of a process for writing data to a storage in accordance with one or more embodiments of the present invention.

Turning now to FIG. 3, a flow diagram 300 of a process for writing data to a storage device is generally shown in accordance with one or more embodiments of the present invention. The processing shown in FIG. 3 can be performed by a processor on a storage device executing logic located on the storage device, such as storage device 104 of FIG. 1. At block 202, a file system interface, such as file system interface 110 of FIG. 1, receives a write request from a host file system, such as host file system 108 of FIG. 1. In accordance with one or more embodiments of the present invention, the write request includes data (write data), and may optionally include a flag or other data which may aid the storage device in selecting an optimal storage location for the write data.

At block 304, the file system interface 110 selects a storage location, such as one of storage locations 112 of FIG. 1, for the write data. For example, a spinning disk might choose to write the data in the next unused block that will fall under a write head. A solid state device might choose a location that best levels the wear across cells. The device may respond to hints or flags provided by the file system. If the file system hints that the data is unlikely to be overwritten, then a solid state device might instead choose a cell with higher wear in order to preserve lower-wear cells for other data more likely to be rewritten. A flag could indicate that this is a tagged write, and the storage device would both choose an appropriate location and also establish the association between the tag and the chosen location (e.g. by updating a table associating the two).

At block 306 of FIG. 3, the write data is stored in the selected storage location(s) 112. At block 308, a write confirmation message and an identifier of the selected storage location(s) is sent to the requesting host file system.

In accordance with one or more embodiments of the present invention, read requests between a host file system executing on a host computer and a storage device can be performed using contemporary methods. In accordance with one or more embodiments of the present invention, the storage location of data written to the storage device is returned to the host file system and stored by the host file system. This allows contemporary read methods to be implemented because the host file system knows the storage location of the data to be read.

In accordance with one or more embodiments of the present invention, hint flags or host tags are carried in the location field (e.g., LBA field) of the legacy write requests but with a different meaning being indicated, for example, but a control flag, opcode or mode setting. In accordance with one or more embodiments of the present invention, contents of the legacy location field in a write command include hints, or hint flags, to aid the storage device in selecting a storage location to store the write data.

Figure 4:
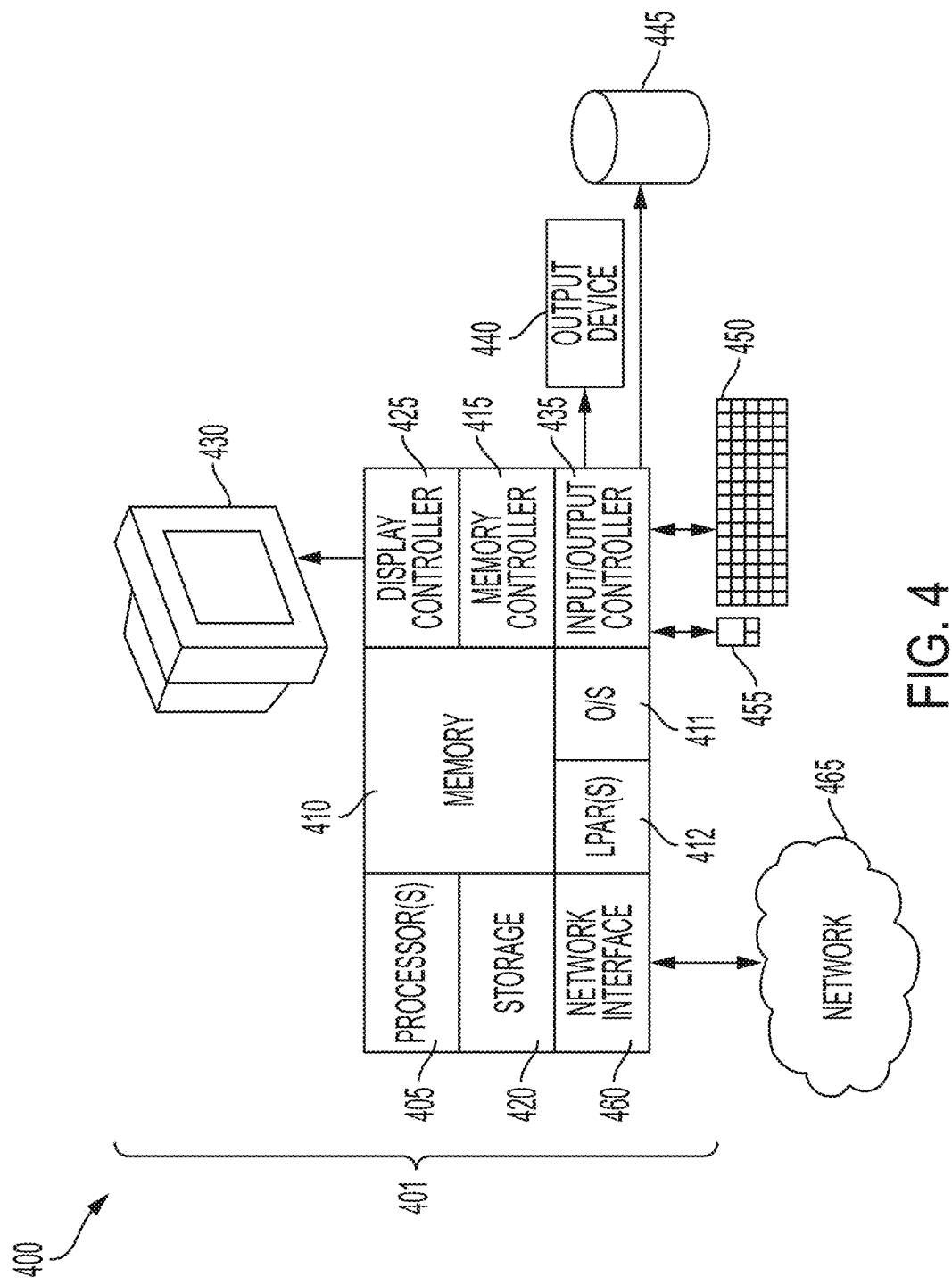
FIG. 4 illustrates a computer system for data placement on a storage device in accordance with one or more embodiments of the present invention.

Turning now to FIG. 4, a computer system 400 for determining data placement on storage devices is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include general-purpose computer or mainframe 401 capable of running multiple instances of an O/S simultaneously.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In an exemplary embodiment, the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a write request at a storage device, the write request including data and the receiving from a file system executing on a host computer communicatively coupled to the storage device;
selecting, by the storage device independently of a memory controller outside the storage device, a physical storage location on the storage device for the data, the selecting based at least in part on characteristics of the storage device, the characteristics of the storage device comprising one or both of mechanical implementation or limitations on write cycles;
storing the data at the physical storage location on the storage device; and
sending a write completion message to the file system confirming that the write of the data has been completed, the write completion message including an identifier of the physical storage location.

2. The method of claim 1, wherein the selecting is further based at least in part on a characteristic of the data.

3. The method of claim 2, wherein the characteristic of the data is selected from the group consisting of expected access frequency, expected ratio of reads versus writes, expected lifespan, backup requirements, security requirements, latency requirements, expiration dates, compressibility, and redundancy requirements.

4. The method of claim 1, wherein the write request further includes an expected data access pattern and the selecting is further based at least in part on the expected data access pattern.

5. The method of claim 1, wherein the write request further includes a tag indicating a particular storage location on the storage device and the selecting is further based at least in part on the tag.

6. The method of claim 1, wherein the storage device includes a direct access storage device (DASD).

7. The method of claim 1, wherein the storage device includes a solid state drive (SSD).

8. The method of claim 1, wherein the storage device includes a shingled magnetic recording (SMR) device.

9. The method of claim 1, further comprising receiving a read request from the file system executing on the host computing system, the read request including the physical storage location.

10. A system comprising:
a memory having computer readable instructions; and
one or more processors for executing the computer readable instructions, the computer readable instructions controlling the one or more processors to perform operations comprising:
receiving a write request at a storage device, the write request including data and the receiving from a file system executing on a host computer communicatively coupled to the storage device;
selecting, by the storage device independently of a memory controller outside the storage device, a physical storage location on the storage device for the data, the selecting based at least in part on characteristics of the storage device, the characteristics of the storage device comprising one or both of mechanical implementation or limitations on write cycles;

storing the data at the physical storage location on the storage device; and sending a write completion message to the file system confirming that the write of the data has been completed, the write completion message including an identifier of the physical storage location.

11. The system of claim 10, wherein the selecting is further based at least in part on a characteristic of the data.

12. The system of claim 11, wherein the characteristic of the data is selected from the group consisting of expected access frequency, expected ratio of reads versus writes, expected lifespan, backup requirements, security requirements, latency requirements, expiration dates, compressibility, and redundancy requirements.

13. The system of claim 10, wherein the write request further includes an expected data access pattern and the selecting is further based at least in part on the expected data access pattern.

14. The system of claim 10, wherein the write request further includes a tag indicating a particular storage location on the storage device and the selecting is further based at least in part on the tag.

15. The system of claim 10, wherein the storage device is selected from the group consisting of a direct access storage device (DASD), a solid state drive (SSD), and a shingled magnetic recording (SMR) device.

16. A computer program product comprising a computer readable storage medium having program instructions embodied therewith, the program instructions executable by a processor to cause the processor to perform operations comprising:

receiving a write request at a storage device, the write request including data and the receiving from a file system executing on a host computer communicatively coupled to the storage device;

selecting, by the storage device independently of a memory controller outside the storage device, a physical storage location on the storage device for the data, the selecting based at least in part on characteristics of the storage device, the characteristics of the storage device comprising one or both of mechanical implementation or limitations on write cycles;

storing the data at the physical storage location on the storage device; and sending a write completion message to the file system confirming that the write of the data has been completed, the write completion message including an identifier of the physical storage location.

17. The computer program product of claim 16, wherein the selecting is further based at least in part on a characteristic of the data.

18. The computer program product of claim 17, wherein the characteristic of the data is selected from the group consisting of expected access frequency, expected ratio of reads versus writes, expected lifespan, backup requirements, security requirements, latency requirements, expiration dates, compressibility, and redundancy requirements.

19. The computer program product of claim 16, wherein the write request further includes a tag indicating a particular storage location on the storage device and the selecting is further based at least in part on the tag.

20. The computer program product of claim 16, wherein the storage device is selected from the group consisting of a direct access storage device (DASD), a solid state drive (SSD), and a shingled magnetic recording (SMR) device.

* * * * *